US009340292B2

(12) United States Patent
Peurifoy et al.

(10) Patent No.: US 9,340,292 B2
(45) Date of Patent: May 17, 2016

(54) CARRY-ON PASSENGER SEAT

(71) Applicant: B/E Aerospace, Inc., Wellington, FL (US)

(72) Inventors: Mark Peurifoy, Kernersville, NC (US); Sam Kenny, Greensboro, NC (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 14/552,798

(22) Filed: Nov. 25, 2014

(65) Prior Publication Data
US 2015/0145292 A1    May 28, 2015

Related U.S. Application Data

(60) Provisional application No. 61/909,513, filed on Nov. 27, 2013.

(51) Int. Cl.
*A47C 4/28* (2006.01)
*B64D 11/06* (2006.01)
*B60N 2/005* (2006.01)

(52) U.S. Cl.
CPC ............ *B64D 11/0639* (2014.12); *B60N 2/005* (2013.01); *B64D 11/06* (2013.01); *B64D 11/0642* (2014.12); *B64D 11/0696* (2013.01)

(58) Field of Classification Search
CPC ........... B64D 11/0639; B64D 11/0696; B64D 11/0642
USPC .............. 297/17, 183.1, 188.04, 252, 344.21, 297/344.22, 352, 397, 440.15, 440.16, 297/440.22
See application file for complete search history.

(56) References Cited

U.S. PATENT DOCUMENTS

| | | | | |
|---|---|---|---|---|
| 2,466,553 A | * | 4/1949 | McDonald, Jr. ...... | B60N 2/4832 297/404 |
| 2,583,410 A | * | 1/1952 | Burnett .................... | B60N 2/34 297/113 |
| 2,652,101 A | * | 9/1953 | Samsky ............... | B60N 2/4832 297/114 |
| 2,707,513 A | * | 5/1955 | Lake ........................ | A47C 1/16 248/231.31 |
| 4,079,992 A | * | 3/1978 | Thrift ....................... | A47C 4/52 297/17 |
| 4,671,572 A | * | 6/1987 | Young ...................... | A47C 3/18 248/425 |
| 4,729,601 A | * | 3/1988 | Walle ................... | B64D 11/064 297/344.1 |
| 5,000,504 A | * | 3/1991 | Munguia .............. | B60N 2/3095 296/57.1 |

(Continued)

FOREIGN PATENT DOCUMENTS

GB    2 480 809 A    12/2011
GB    2 491 552 A    12/2012

OTHER PUBLICATIONS

International Search Report dated Mar. 10, 2105 for PCT/US2014/067265.

*Primary Examiner* — Adriana Figueroa
(74) *Attorney, Agent, or Firm* — Shumaker, Loop & Kendrick, LLP

(57) ABSTRACT

A carry-on passenger seat adapted to mount upon a support pedestal in an aircraft, the seat including a seatback pivotably connected to a seat bottom such that the seatback is configured to fold against the seat bottom, and an elongate slot formed in an underside of the seat bottom, an elongate member of the support pedestal adapted to be received through the elongate slot and rotated relative thereto to prevent the seat bottom from being pulled apart from the support pedestal.

9 Claims, 4 Drawing Sheets

(56) References Cited

U.S. PATENT DOCUMENTS

| | | | | |
|---|---|---|---|---|
| 5,044,587 A * | 9/1991 | Degen | A47C 3/025 108/150 |
| 5,106,158 A * | 4/1992 | Dukatz | B60N 2/3084 297/112 |
| 5,176,422 A * | 1/1993 | Canet | A45C 9/00 297/118 |
| 5,439,269 A * | 8/1995 | Cheng | A47C 4/02 108/150 |
| 5,505,524 A * | 4/1996 | Drumwright | A47C 1/04 248/169 |
| 5,658,047 A * | 8/1997 | Ratza | B63B 29/04 297/125 |
| 5,690,389 A * | 11/1997 | Ekman | A47C 3/16 248/599 |
| 5,803,543 A | 9/1998 | Hartmann | |
| 5,975,630 A * | 11/1999 | Schreiber | A47C 1/14 297/217.3 |
| 6,467,843 B1 * | 10/2002 | Rossborough | A47C 3/34 108/150 |
| 6,691,970 B1 * | 2/2004 | Sutton, Sr. | B60N 2/062 248/425 |
| 9,079,067 B2 * | 7/2015 | Huber | A63B 22/0605 |
| 2009/0224496 A1 * | 9/2009 | Watts | A47C 1/14 280/47.38 |
| 2011/0170948 A1 | 7/2011 | Williams et al. | |

\* cited by examiner

CARRY-ON PASSENGER SEAT

CROSS-REFERENCE TO RELATED APPLICATION

This Application claims priority from U.S. application Ser. No. 61/909,513 filed Nov. 27, 2013, the entirety of which is incorporated by reference herein.

TECHNICAL FIELD AND BACKGROUND OF THE INVENTION

The present invention relates generally to a removable aircraft passenger seat, and more particularly, to a personal carry-on passenger seat configured to mount upon a support pedestal installed within an aircraft.

Passenger airline carriers are continuously seeking to elevate the levels of luxury in premium-class passenger seating areas in response to travelers' expectations and appetites for luxurious accommodations. In this regard, premium-class seating sections presently include individual passenger suites, lie-flat capable seats, leather seating surfaces, advanced media, electronics and internet connections, etc. To date, airline carriers have yet to satisfy the brand-conscious traveler.

Travelers with the means to afford premium-class seating also typically have the means to afford premium luggage, as evident from high-end luggage available from premium brands such as Louis Vuitton®, Hermes® and Gucci®, among others. While a typical carry-on bag may cost a few hundred dollars, premium carry-on bags from one of these luxury brands may cost in excess of several thousand dollars. While airline carriers could potentially partner with such manufacturers to co-brand and cover conventional fixed seats, most brand-conscious travelers seeking extravagant seating would prefer to have their own personal seat that would not be used by others.

As such, the present invention is directed to a personal, carry-on passenger seat that could potentially be manufactured in cooperation with one of the foregoing luxury suppliers. Such a seat would be personal and for the sole use of one passenger. A carry-on seat would have the added advantages of shifting a portion of the seat costs in the aircraft to the passenger, simplifying seating arrangements, permitting flexible/alternative seating arrangements, satisfying traveler demands for premium brands and personalization, helping to reduce the spread of germs, and reducing maintenance and cleaning needs, among other advantages.

BRIEF SUMMARY OF THE INVENTION

Accordingly, it is an object of the present invention to provide a carry-on passenger seat configured to mount upon a support pedestal installed within an aircraft such as a commercial passenger type aircraft.

It is another object of the invention to provide a personal, carry-on passenger seat developed in cooperation with luxury suppliers to co-brand an extravagant seat.

It is a further object of the invention to provide a passenger-owned carry-on passenger seat configured to travel with the passenger and certified for use in an aircraft.

It is a further object of the invention to provide a carry-on passenger seat developed with cooperation from a seat manufacturer to develop a certified chassis and structure for accommodating the chassis in the aircraft, and a luxury supplier to upholster and otherwise customize the seat.

To achieve the foregoing and other objects and advantages, provided herein is a carry-on passenger seat adapted to mount upon a support pedestal in an aircraft, the seat including a seatback pivotably connected to a seat bottom such that the seatback is configured to fold against the seat bottom, and an elongate slot formed in an underside of the seat bottom, an elongate member of the support pedestal adapted to be received through the elongate slot and rotated relative thereto to prevent the seat bottom from being pulled apart from the support pedestal.

In a further aspect the seat may include a headrest pivotably attached to the seatback such that the headrest is configured to fold against the seatback.

In a further aspect, the seatback may define a recess in at least one of a frontside and a backside thereof, the recess adapted to receive the headrest when the headrest is in a stowed position folded against the seatback.

In a further aspect, the seat may include a handle located near a pivotal attachment point of the headrest and the seatback, the handle accessible for use when the headrest is folded against the seatback.

In a further aspect, the seat bottom may be hollow so as to receive the elongate member of the support pedestal therein.

In another embodiment, the present invention provides a seat system including a support pedestal adapted to be installed within an aircraft, the support pedestal including a fixed base, a post configured to move vertically relative to the base, and an elongate member atop the post configured to rotate horizontally relative to the post. The system further includes a carry-on passenger seat adapted to mount upon the support pedestal, the carry-on passenger seat including a seatback pivotably connected to a seat bottom such that the seatback is configured to fold against the seat bottom, and an elongate slot formed in an underside of the seat bottom, the elongate member of the support pedestal adapted to be received through the elongate slot and rotate relative thereto to prevent the seat bottom from being pulled apart from the support pedestal.

In another aspect, the base may directly contact the underside of the seat bottom and may be contoured complementary to a contour of the underside of the seat bottom.

In a further aspect, the base may surround the post and the post may be configured to rise vertically from the base and lower vertically into the base.

In a further aspect, the carry-on passenger seat may be attached to the support pedestal by first vertically raising the post from the base, secondly inserting the elongate member through the elongate slot, thirdly rotating the elongate member horizontally relative to the post, and lastly vertically lowering the post into the base.

In a further aspect, the elongate member may be configured to rotate 90 degrees relative to the post.

In a further aspect, the carry-on passenger seat may further include a headrest pivotably attached to the seatback such that the headrest is configured to fold against the seatback.

In a further aspect, the seatback may define a recess in at least one of a frontside and a backside thereof, the recess adapted to receive the headrest when the headrest is in a stowed position folded against the seatback.

In a further aspect, the seat may include a handle located near a pivotal attachment point of the headrest and the seatback, the handle accessible for use when the headrest is folded against the seatback.

In a further aspect, the seat bottom may be hollow so as to receive the elongate member of the support pedestal therein.

In a further aspect, a portion of the seat bottom may be captured between the base and the elongate member when the elongate member is in a rotated position within the seat bottom and the post is retracted into the base.

Embodiments of the invention can include one or more or any combination of the above features, aspects and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Additional features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, the present invention provides a carry-on passenger seat configured to unfold or "open up" to be used as a single, one person seat. The seat is thus capable of achieving a luggage configuration when folded and a single passenger seat when unfolded. Each seat may be custom made on a common chassis. The seat may attach to a common style adapter plate or support pedestal in the aircraft via a palette as discussed in detail below. The seat can be created and co-branded by luxury suppliers such as Hermes® and Louis Vuitton®, among others. The seat may be seen as an upmarket custom travel proposition or status symbol.

Each seat, while capable of being different aesthetically, may be identical in load path configuration and essential mass. Each seat producer may be required to have their seat product certified for carry-on and use on a plane. In one embodiment, the seat is a certified artifact that functions as a personal seat and a piece of carry-on luggage, i.e., a double function device. When the structure (e.g., adapter plate, support pedestal, etc.) that allows the seat to attach is not being used to support the seat, said structure can used for another purpose such as supporting a table or as a stowage area.

Figure 1:
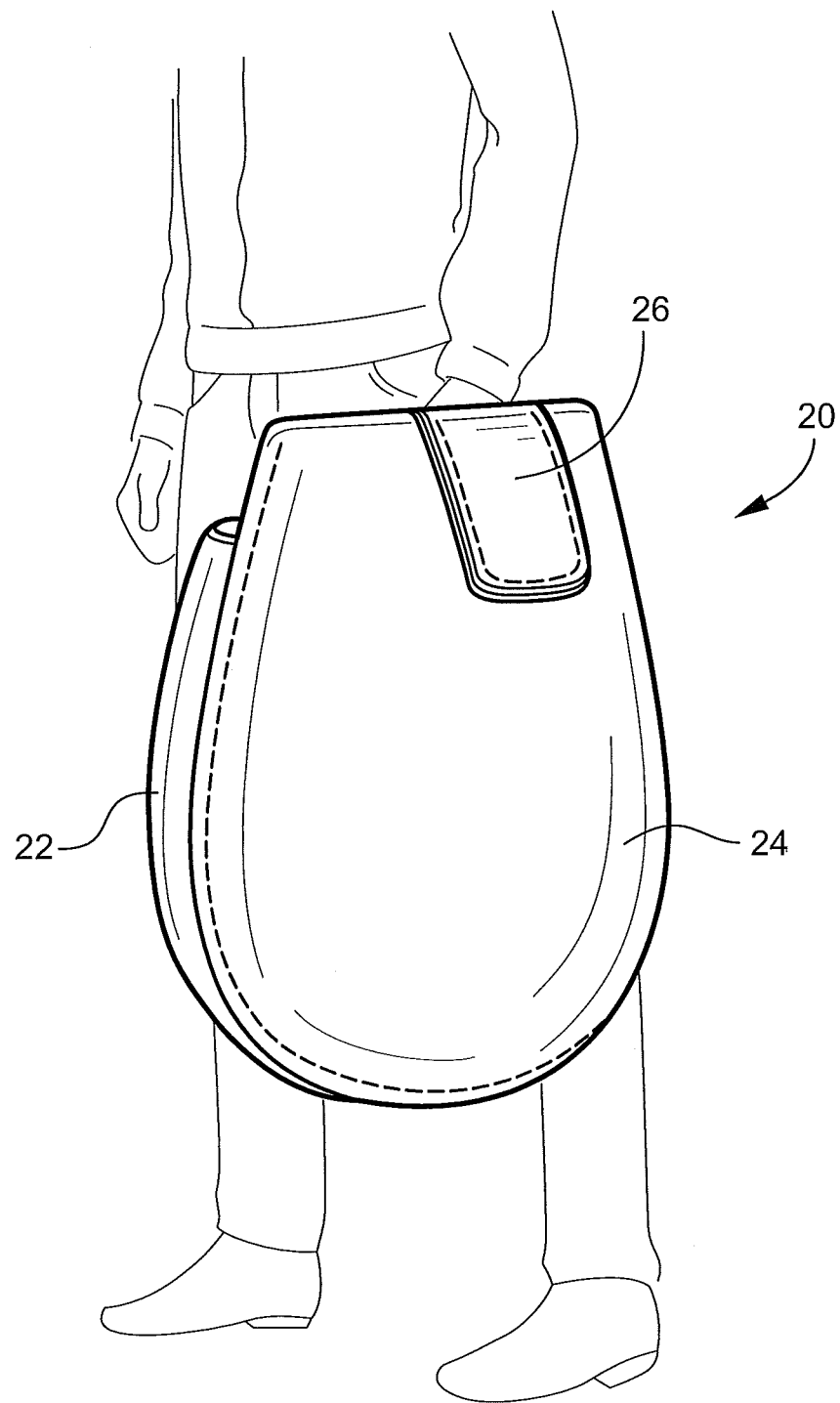
FIG. 1 shows a carry-on passenger seat in a folded configuration according to an embodiment of the invention.

Referring to FIG. 1, a preferred embodiment of a carry-on passenger seat is shown generally at reference numeral 20. The seat 20 generally includes a seat bottom 22 and a seatback 24 connected by way of a pivotal connection that allows the seatback 24 to fold down onto or against the seat bottom 22. FIG. 1 shows the seatback 24 folded down onto the seat bottom 22 to achieve a luggage configuration dimensioned to satisfy carry-on luggage size limitations. In the folded configuration, a hollow cavity formed between the seat bottom 22 and seatback 24 may be used to carry items such as a pillow, blanket, clothing, personal items, etc., essentially functioning as carry-on luggage.

Figure 2:
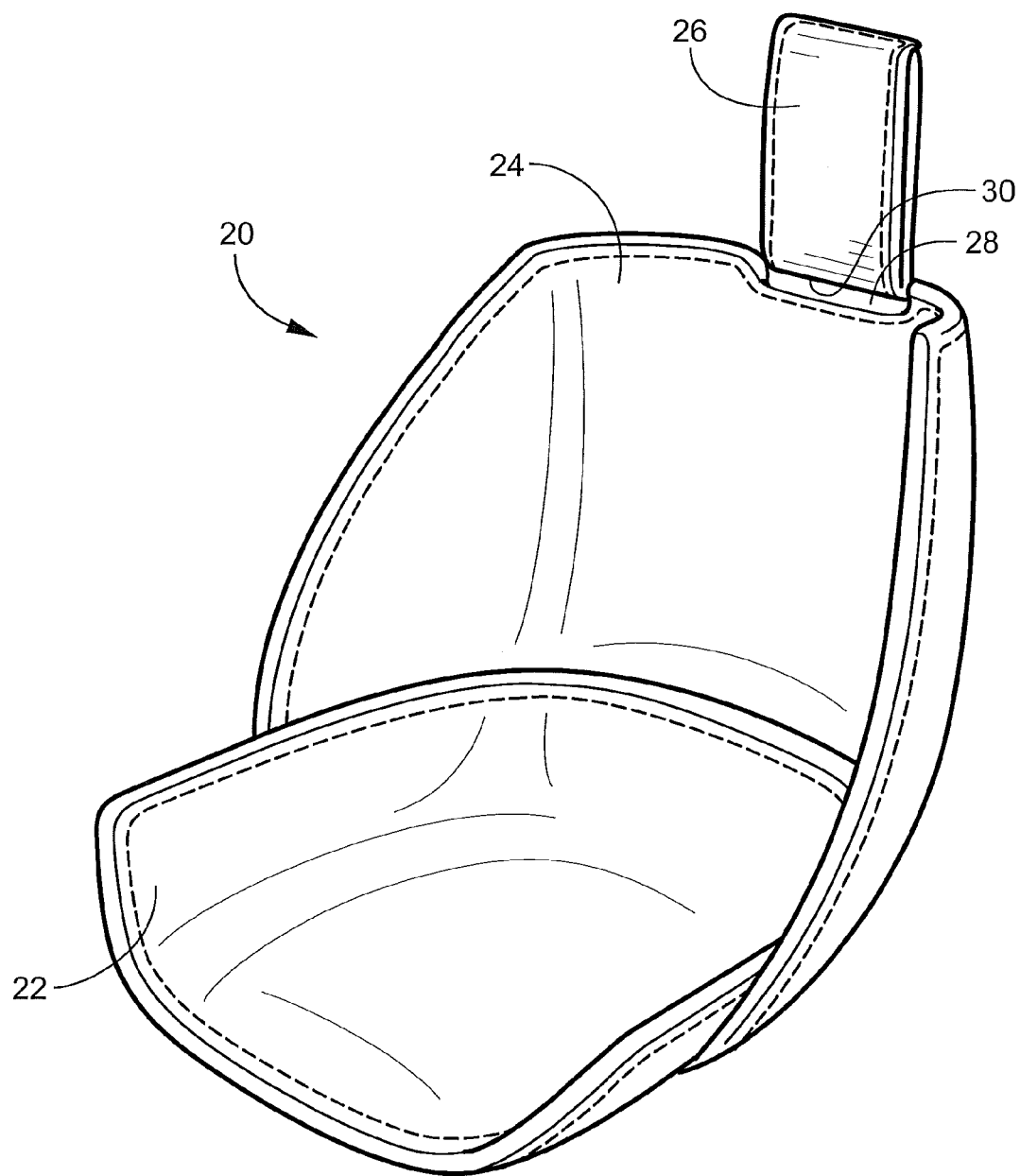
FIG. 2 shows the carry-on passenger seat unfolded for use as a seat.

FIG. 2 shows the seat 20 unfolded for use as a passenger seat. To achieve the seat configuration, the seatback 24, which may be locked in position, may be unlocked and pivoted away from the seat bottom 22. Locking mechanisms may include conventional locking mechanism located in at one or more of the pivot point between the seat bottom 22 and seatback 24 and contact points therebetween. The seat 20 may further include a deployable headrest 26 configured to deploy (e.g., pivot) for use and fold flat against the seatback 24 between uses. The headrest 26 may be pivotably attached to the seatback 24, and the seatback 24 may define a recess in at least one of the frontside and backside thereof for receiving the headrest between uses and when in the luggage configuration. As shown in FIG. 1, the recess is formed in the backside of the seatback 24 such that the headrest 26 stows flush against the backside of the seatback 24. A gap 28 may be provided between the bottom end of the headrest 26 and the top of the seatback 24 such that when the headrest is stowed, a carrying handle 30 (e.g., the bottom of the headrest) is accessible for carrying the seat.

In the luggage configuration shown in FIG. 1, the "clamshell" design of the seat 20 provides a cavity for carrying items, such as matching luggage or the items discussed above. Thus, the seat 20 may be provided as a stand-alone item or as a set including matching luggage. The seat may 20 include additional functional features such as a conventional seatbelt (e.g., two-point seatbelt or three-point seatbelt) and/or additional luxury features such as a recline mechanism (e.g., manual or automated), folding armrests, etc. The seat may be customized by the luxury supplier in terms of padding, materials, leather, etc., and certain portions thereof such as the headrest shape may also be customized without voiding any certification. Although not shown, a seatbelt may be anchored to the support pedestal discussed below, the seatbelt arranged to be pulled over the seated passenger's lap and buckled into the receiver anchored on the opposing side.

Figure 3:
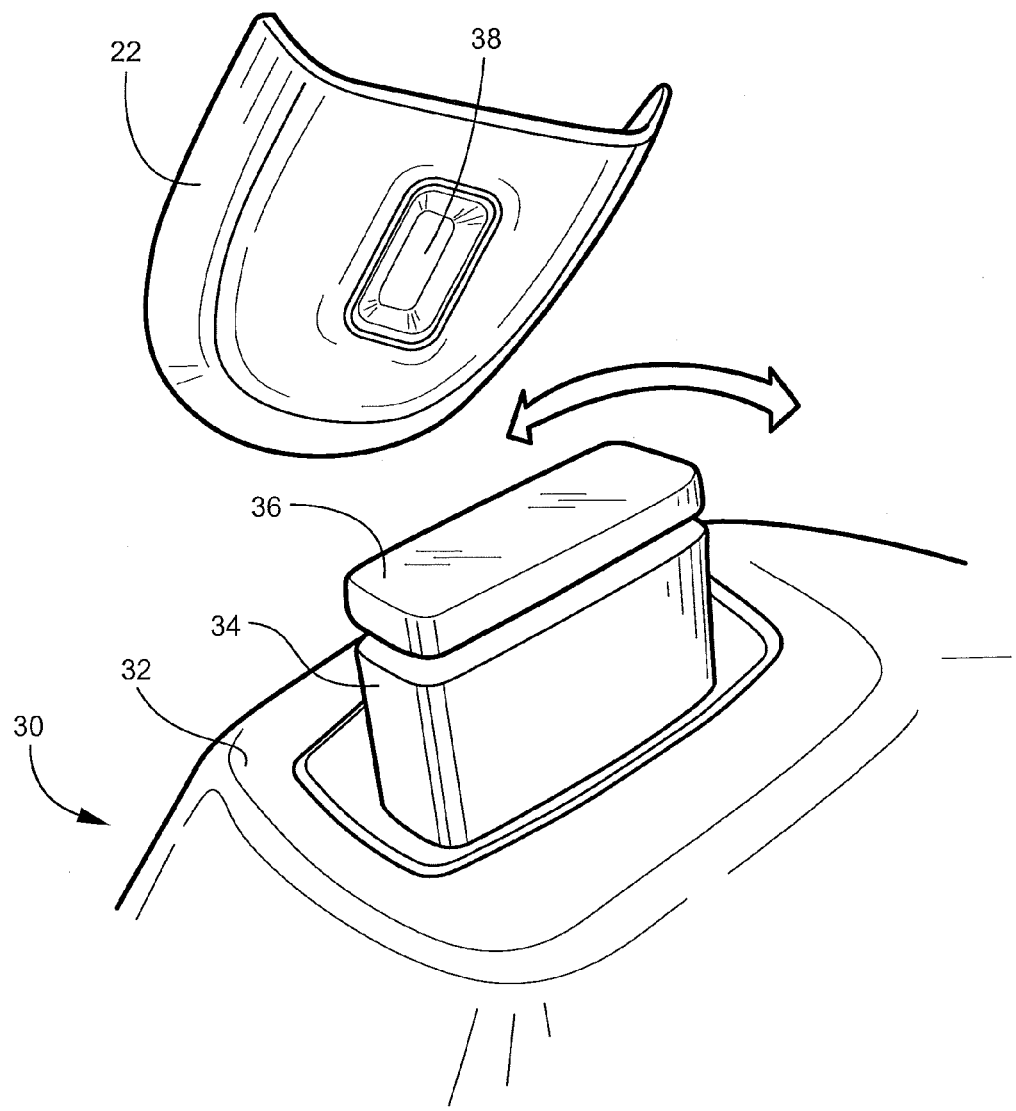
FIG. 3 details the point of attachment of the underside of the carry-on passenger seat and the underlying support pedestal installed in the aircraft.

FIG. 3 illustrates the general engagement of the seat bottom 22 with an underlying support pedestal 30. The support pedestal 30 is installed within the aircraft and generally includes a base 32, a post 34 configured for vertical movement relative to the base 32, and an elongate member 36 positioned atop the post configured to rotate horizontally relative thereto. As shown, an elongate slot 38 is formed in the underside of the seat bottom 22 sized and shaped to receive the elongate member 36 therethrough. The elongate slot 38 provides access to a cavity defined within the hollow seat bottom 22 for accommodating the elongate member 36 therein in "locked" and "unlocked" configurations.

The support pedestal 30 is anchored to the floor and extends vertically upward to support the mounted seat 20 in an elevated position, and the base 32 and underside of the seat bottom 22 may be complementary contoured. The elongate member 36 rotates generally horizontally relative to the post 34 to lock/release the seat 20 to/from the pedestal as discussed below. The base 30 surrounds or "shrouds" the post 34 and provides stability to the installed seat 20. Support pedestal electronics and associated cabling may be concealed within the contoured base 32.

Figure 4A:
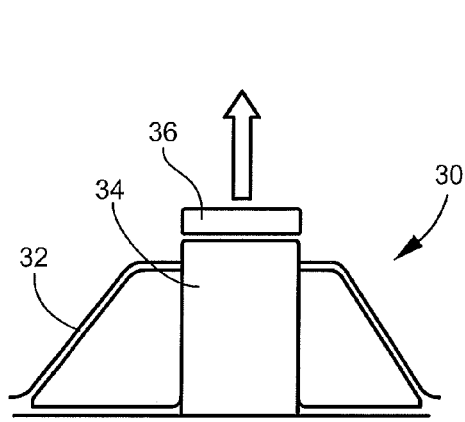
FIGS. 4a-d are sequential views detailing carry-on passenger seat installation upon the underlying support pedestal.
Figure 4B:
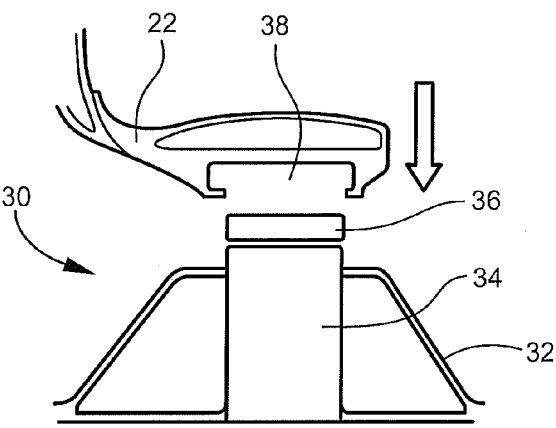
Figure 4C:
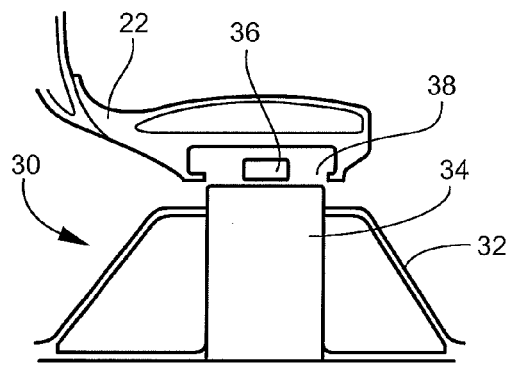
Figure 4D:
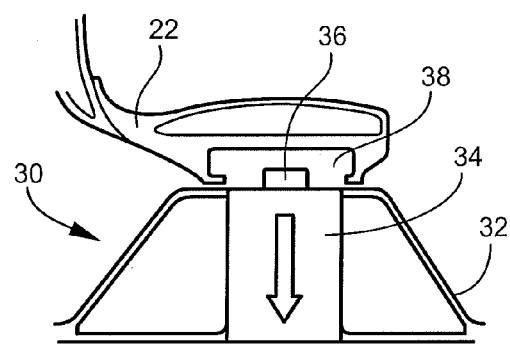

FIGS. 4a-d illustrate the sequential steps of seat attachment to/on the underlying support pedestal 30. Referring to FIG. 4a, the post 34 is first raised vertically from the surrounding base 32 to expose the elongate member 36 for receipt within the corresponding elongate slot 38 defined in the underside of the seat bottom 22. Referring to FIG. 4b, with the elongate slot 38 and elongate member 36 aligned, the seat bottom 22 is lowered vertically onto the support pedestal 30 such that the elongate member 36 is received through the elongate slot 38. Referring to FIG. 4c, with the elongate member 36 received within the interior of the seat bottom 22, the elongate member is then rotated horizontally such that the elongate member and elongate slot are misaligned. As shown, the elongate member 36 is rotated transverse (e.g., 90-degrees relative to the elongate slot 38 such that the seat bottom 22 is prevented from being pulled apart from the support pedestal 30. Referring to FIG. 4d, the post 34 is finally lowered vertically into the base 32 such that the seat bottom 22 is captured and compressed between the elongate member 36 and the base, thereby stabilizing the seat 20. The seat 20 is removed from the support pedestal 30 by reversing the steps shown in FIGS. 4a-d.

The seat bottom 22 is captured, and in a particular embodiment compressed, between the elongate member 36 and the base 32. The base 32 is dimensioned and shaped, and the elongate member 36 has a length sufficient to extend laterally left and right, to support and provide stability to the seat 20. In a particular embodiment, the seat bottom 22 and the base 32 may be provided with complementary contours to provide further stability to the mounted seat and prevent relative movement therebetween.

Rotation of the elongate member 36 of the pedestal may be achieved by an actuator housed within the base 32 and controlled by the flight crew or passenger by way of passenger seat controls. In an alternative embodiment, the elongate slot may be arranged transverse to the longitudinal axis of the seat and the top of the support pedestal may be fixed such that the seat is first placed on the support pedestal and subsequently rotated with respect to the pedestal to lock the seat in place. The pedestal may then lowered as described above to capture and compress the seat bottom. The post may be configured to lower into the base when not in use.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A seat system, comprising:
a support pedestal adapted to be installed within an aircraft, the support pedestal including a fixed base, a post configured to move vertically relative to the base, and an elongate member atop the post configured to rotate horizontally relative to the post; and
a carry-on passenger seat adapted to mount upon the support pedestal, the carry-on passenger seat including a seatback pivotably connected to a seat bottom such that the seatback is configured to fold against the seat bottom, and an elongate slot formed in an underside of the seat bottom, the elongate member of the support pedestal adapted to be received through the elongate slot and rotate relative thereto to prevent the seat bottom from being pulled apart from the support pedestal;
wherein a portion of the seat bottom is captured between the base and the elongate member when the elongate member is in a rotated position within the seat bottom and the post is retracted into the base.

2. The seat system of claim 1, wherein the base directly contacts the underside of the seat bottom and is contoured complementary to a contour of the underside of the seat bottom.

3. The seat system of claim 1, wherein the base surrounds the post and the post is configured to rise vertically from the base and lower vertically into the base.

4. The seat system of claim 1, wherein the carry-on passenger seat is attached to the support pedestal by first vertically raising the post from the base, secondly inserting the elongate member through the elongate slot, thirdly rotating the elongate member horizontally relative to the post, and lastly vertically lowering the post into the base.

5. The seat system of claim 4, wherein the elongate member is configured to rotate 90 degrees relative to the post.

6. The seat system of claim 1, wherein the carry-on passenger seat further comprises a headrest pivotably attached to the seatback such that the headrest is configured to fold against the seatback.

7. The seat system of claim 6, wherein the seatback defines a recess in at least one of a frontside and a backside thereof, the recess adapted to receive the headrest when the headrest is in a stowed position folded against the seatback.

8. The seat system of claim 6, further comprising a handle located near a pivotal attachment point of the headrest and the seatback, the handle accessible for use when the headrest is folded against the seatback.

9. The seat system of claim 1, wherein the seat bottom is hollow so as to receive the elongate member of the support pedestal therein.

* * * * *